W. LEWIS.
Photographic Plate-Holders.

No. 138,414.    Patented April 29, 1873.

Witnesses.
Chas H Smith
Harold Serrell

Inventor
William Lewis
Lemuel W. Serrell
atty

UNITED STATES PATENT OFFICE.

WILLIAM LEWIS, OF BROOKLYN, NEW YORK.

IMPROVEMENT IN PHOTOGRAPHIC-PLATE HOLDERS.

Specification forming part of Letters Patent No. 138,414, dated April 29, 1873; application filed October 22, 1872.

*To all whom it may concern:*

Be it known that I, WILLIAM LEWIS, of Brooklyn, Kings county, State of New York, have invented Improvements in Plate-Frames for Photographic Cameras, of which the following is a specification:

Plate-frames have been made with corners of glass and other material to receive the corners of the photographic plate, and these corners have been adapted to the plate in either position, so that the longest measurement of the plate may be either horizontal or vertical. The corners have either been made with two recesses, or else there has been a curved off-set or ledge for the angle of the plate to rest against. In these cases the plate has been confined, and its position could not be varied, or else there was a risk that the operator would place the plate in an incorrect position, because the rounding corner is not a sufficiently definite guide for the angle of the plate as the operator introduces the same, and in case of the plate slipping, the rounding or concave corner does not form a sufficiently definite stop; but the angle of the plate is liable to slip upon the slight incline that there is at the place where the corner of the plate usually comes into contact with the off-set.

My invention is made for overcoming the difficulties before named; and consists in a corner for photographic frames made with a straight diagonal ledge for the corners of the plate to rest against, and with a flat bearing-surface for the surface of the plate, thereby facilitating the positioning of the plate and its support when in use.

Figure 2:
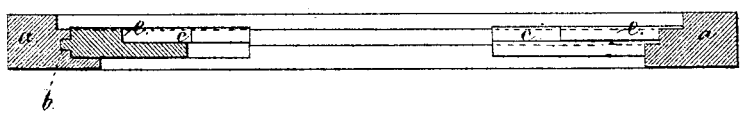
Figure 1:
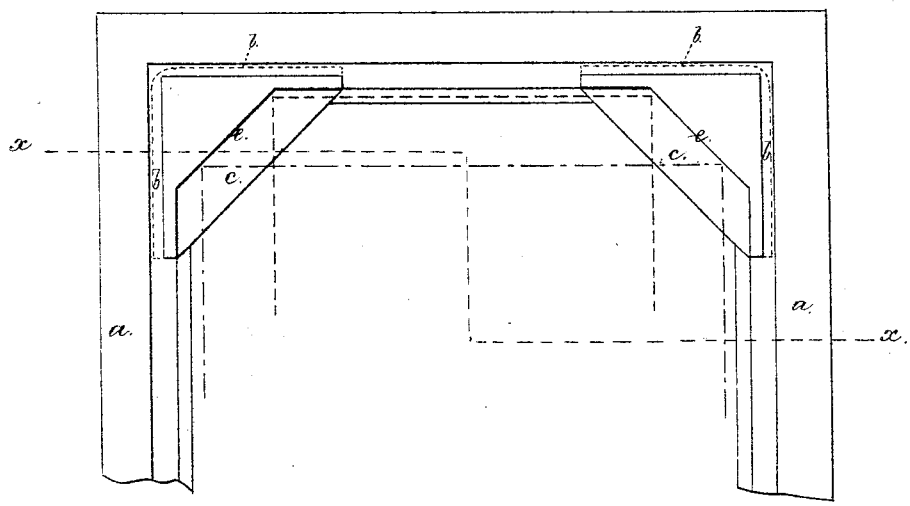

In the drawing, Figure 1 is an elevation of a portion of said plate-frame, and Fig. 2 is a sectional view of the corner at the line $x\ x$.

The frame $a$ is of any desired size. It is usually square, and adapted to the camera. My improved corner is of glass or other suitable material, secured by the rib $b$ within the angle of the frame. The surface of the plate rests upon the portion $c$ of the corner, and the angle of the plate rests against the diagonal ledge or off-set $e$. The dotted lines, Fig. 1, show portions of plates in different positions.

It will be seen that the diagonal straight ledge $e$ forms a definite stop for the plate, but allows said plate to be placed either way in the frame.

There may be an opening behind the straight diagonal ledge, between that and the frame $a$.

I claim as my invention—

The corner for the photographic-plate frame, made with a straight ledge or off-set running diagonally to the sides of the frame, as and for the purposes set forth.

Signed by me this 18th day of October, A. D. 1872.

WILLM. LEWIS.

Witnesses:
 GEO. T. PINCKNEY,
 CHAS. H. SMITH.